United States Patent [19]
Develle et al.

[11] Patent Number: 4,483,273
[45] Date of Patent: Nov. 20, 1984

[54] SHELTER PRESSURIZATION AND FILTER INSTALLATION

[75] Inventors: Guy Develle, Domont; Alain Regnier, Bezons, both of France

[73] Assignee: Sofiltra-Poelman, La Garenne Colombes, France

[21] Appl. No.: 439,940

[22] Filed: Nov. 8, 1982

[30] Foreign Application Priority Data
Feb. 26, 1982 [FR] France ................. 82 03190

[51] Int. Cl.³ .................. E05G 3/00; B01D 46/12
[52] U.S. Cl. .................. 109/1 S; 55/385 A; 55/480; 55/493; 55/502; 55/DIG. 9; 98/1.5
[58] Field of Search .................. 109/1 S; 55/74, 316, 55/387, 480, 493, 385 A, DIG. 9, 502, 489, 484, 350, 507; 206/606; 98/1.5, 33 R

[56] References Cited
U.S. PATENT DOCUMENTS

| | | | |
|---|---|---|---|
| 3,103,154 | 9/1963 | Rosenfeld | 109/1 S |
| 3,138,124 | 6/1964 | Baier | 109/1 S |
| 3,164,111 | 1/1965 | Lanni | 109/1 S |
| 3,389,647 | 6/1968 | Wolfe | 98/1.5 |
| 3,401,619 | 9/1968 | Sotory | 98/1.5 |
| 3,426,936 | 2/1969 | Palmer | 206/606 |
| 3,509,810 | 5/1970 | Riester | 98/1.5 |
| 3,861,894 | 1/1975 | Marsh | 55/493 |
| 4,021,212 | 5/1977 | Legler | 55/507 |
| 4,066,425 | 1/1978 | Nett | 55/493 |
| 4,124,361 | 11/1978 | Revell | 55/493 |

Primary Examiner—Gene Mancene
Assistant Examiner—Kris R. Schulze
Attorney, Agent, or Firm—Lee C. Robinson, Jr.

[57] ABSTRACT

A pressurization and filter installation for shelters, notably of the substantially horizontal tubular tunnel type, comprises at least one entry-exit section communicating with a respective entry-exit airlock. This is adapted to be pressurized, in use, to a pressure higher than the normal external pressure. There is an armored door on the outside of the airlock. There is a sealed door on the inside of the airlock, controlling access to the shelter interior. The shelter interior is pressurized to a pressure higher than that in the airlock. Filter units are disposed in the airlock. Each filter unit comprises at least one absolute filter and at least one activated carbon filter. The shelter provides protection against the effects of nuclear, biological and chemical weapons.

3 Claims, 7 Drawing Figures

SHELTER PRESSURIZATION AND FILTER INSTALLATION

BACKGROUND OF THE INVENTION

1. Field of the Invention

The present invention concerns a pressurization and filter installation, notably for shelters designed to protect personnel against the effect of nuclear, biological and chemical weapons, with sealing means containing and protecting the shelter interior against overpressures and underpressures due to explosions.

2. Description of the Prior Art

While existing installations of this type have proved satisfactory, our work has shown that they nevertheless have certain disadvantages.

The equipment filtering the air entering the interior of the shelter is situated inside the shelter, with the occupants. This arrangement involves the hazard of the occupants being irradiated when the filter has absorbed a large quantity of radioactive dust or iodine. Means are available for overcoming these disadvantages, but for the most part these consist in protective devices which must be added to the filter batteries. These are generally relatively expensive.

The shelter is isolated from the outside by the provision of two trapdoors, one of which is thermally insulative, disposed in a vertical access shaft leading into an airlock communicating with the interior of the shelter through an armoured door. Sanitary facilities are normally disposed in this airlock. If these two barriers are damaged as the result of an explosion, only the armoured door continues to provide isolation from the outside. If the sealing of the latter leaves something to be desired, toxic gases may infiltrate into the shelter, representing a danger to the health of its occupants. Also, the sanitary facilities in the airlock remain inaccessible, at least temporarily, being exposed to a contaminated atmosphere.

It should also be mentioned that pressurization and filter installations already available for shelters designed to protect a few dozen persons leave a great deal to be desired in respect of the arrangement and effectiveness of the airlocks. No decontamination means are provided for use after a reconnaissance patrol carried out by a few occupants, and contaminated air admitted into the airlock may in turn contaminate the atmosphere in the shelter.

The present invention is directed towards a combination of arrangements providing for a significant improvement in the effectiveness of pressurization and filter installations for shelters designed to protect a few dozen persons against the effects of nuclear, biological and chemical (NBC) weapons.

SUMMARY OF THE INVENTION

The invention consists in a pressurization and filter installation for shelters, notably of the substantially horizontal tubular tunnel type, comprising an entry-exit section, an entry-exit airlock which is adapted to pressurized, in use, to a pressure higher than the normal external pressure and which communicates with said entry-exit section, an armoured door on the outside of said airlock, a sealed door on the inside of said airlock, a filter unit disposed in said airlock and comprising an absolute filter and an activated carbon filter, and means for pressurizing the interior of said shelter to a pressure higher than the pressure in said airlock.

The installation in accordance with the present invention is constructed so as to overcome the disadvantages mentioned hereinabove.

As the filter boxes are disposed in the airlock and the latter is separated from the shelter interior by a sealed door, the potential hazard of irradiation of the occupants when the filters in the boxes have absorbed a large quantity of radioactive dust or iodine is significantly reduced.

Also, the differences in relative pressure between the interior and the airlocks on the one hand and between the airlocks and the outside on the other hand provide for regenerating the atmosphere of the airlocks and compensating for any leaks which may occur, through cracks, for example. This pressurization prevents contaminated air entering the shelter interior and airlocks through such leaks.

In one embodiment, the installation comprises at least two entry-exit sections each communicating with a respective entry-exit airlock. In a variant of this embodiment, a secondary decontamination airlock is disposed between one of said entry-exit airlocks and the interior of said shelter.

Thanks to these arrangements, should one entry-exit section be rendered unserviceable, as the result of an explosion, for example, but should at least the sealed door between the adjoining entry-exit airlock and the shelter interior remain intact, the shelter would remain properly isolated from the outside. The other entry-exit section could continue to be used.

It should be noted that the aforementioned variant provides for reconaissance patrols in a contaminated atmosphere with adequate decontamination of the personnel participating, firstly in the entry-exit airlock used and then in the adjoining secondary decontamination airlock.

Other objects and advantages will appear from the following description of an example of the invention when considered in connection with the accompanying drawings, and the novel features will be particularly pointed out in the appended claims.

DESCRIPTION OF THE PREFERRED EMBODIMENTS

Figure 1:
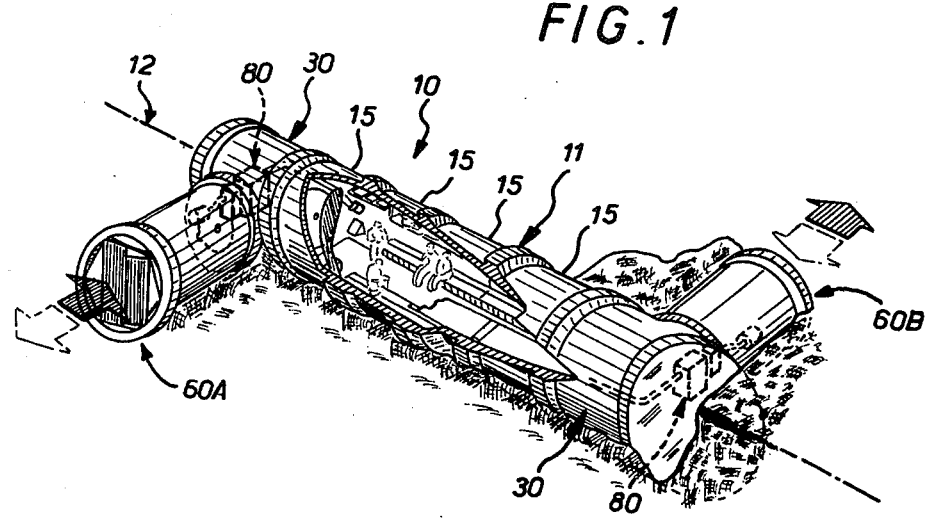
FIG. 1 is partially cut away perspective view of a shelter comprising an installation in accordance with the present invention.
Figure 2:
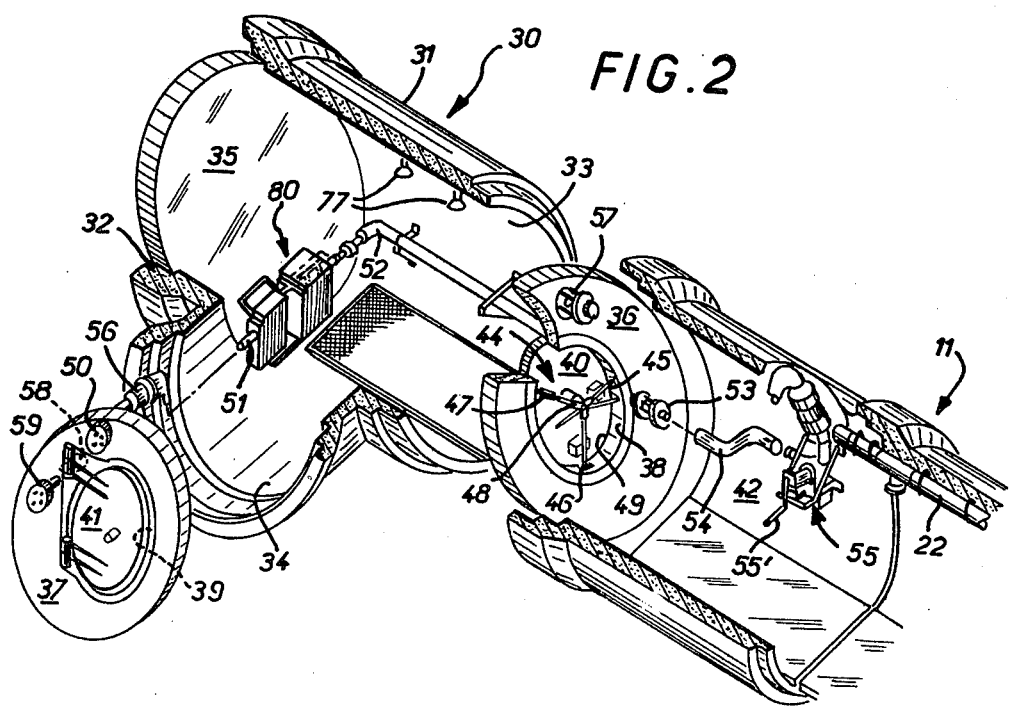
FIG. 2 is an exploded view in perspective of an airlock in accordance with the present invention.

In the embodiment shown in FIGS. 1 and 2, a shelter 10 consists of a tubular tunnel 11 with its axis of symmetry 12 substantially horizontal.

In this embodiment, tunnel 11 is built up from standard sections 15 in the form of prefabricated reinforced concrete pipe sections 2.5 m in diameter joined end to end.

In accordance with the invention, the installation comprises at least two oppositely directed entry sections 60A, 60B each communicating with an entry-exit airlock 30, of which there is one at each end of tunnel 11 in this embodiment. An entry-exit airlock 30 will now be described with reference to FIG. 2.

Each airlock 30 comprises, in the embodiment shown, a section 31 connecting tunnel 11 to an entry-exit tunnel perpendicular to it. To this end, section 31 has three openings 32, 33 and 34. Opening 32 is hermetically sealed by a reinforced concrete disk 35. Openings 33 and 34 are closed by disks 36 and 37 with central openings 38 and 39. Opening 38 is closed by a sealed door 40 and opening 39 is closed by a sealed and armored door 41.

Sealed door 40, controlling access to the interior 42 of tunnel 11, is cast from light alloy and is designed to resist a direct external pressure (in the airlock) of 0.5 bars and a static underpressure of 0.2 bars.

Door 40 is locked in the closed position by a locking system 44 with three locking points 45, 46 and 47 and a central control device 48. The surround 49 of door 40 and the locking system are designed to resist pressures and underpressures equivalent to those indicated hereinabove.

In this embodiment, armored door 41 is designed to withstand a direct shock wave equivalent to an external static pressure of 7 bars and a counterpressure equivalent to a static pressure of 2 bars.

It is also locked by a centrally-controlled three-point locking device, similar to that of door 40 but not shown in FIG. 2. The door surround and locking device are designed to resist the pressures mentioned hereinabove.

The circuit supplying air to shelter interior 42 will now be described. Air is drawn in through an inlet 50 embedded in disk 37. This inlet leads, in a manner familiar to those skilled in the art, to an anti-blast valve 56 whose outlet is connected by flexible trunking 51 to an air filter device 80 to be described later with reference to FIGS. 5 to 8. Trunking 52 connects the outlet from device 80 to an air inlet 53 to shelter interior 42 embedded in disk 36.

Air inlet 53 is connected by flexible trunking 54 to a fan 55 which is normally driven by an electric motor but which may when necessary be rotated manually (crank handle 55′).

The fan outlet is connected to clean air trunking 22.

Air is removed from shelter interior 42 by means of a closable overpressure valve 57 embedded in disk 36. Air is removed from the airlock to the outside by means of an air outlet 59 embedded in disk 37 and preceded by an anti-blast valve/overpressure valve assembly 58.

In the embodiment shown in FIG. 2, decontamination showers 77 are installed in airlock 30.

Figure 3:
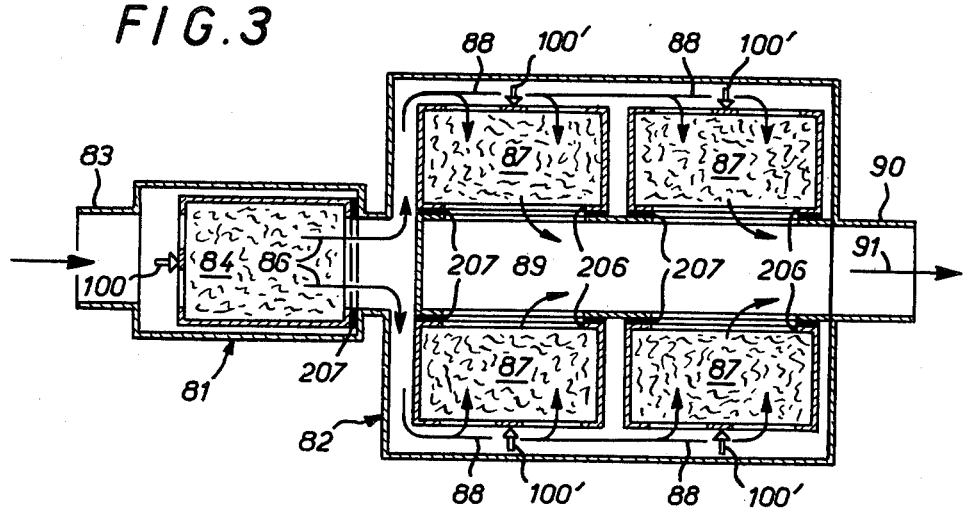
FIG. 3 is a schematic plan view of a filter device in accordance with the present invention.
Figure 4:
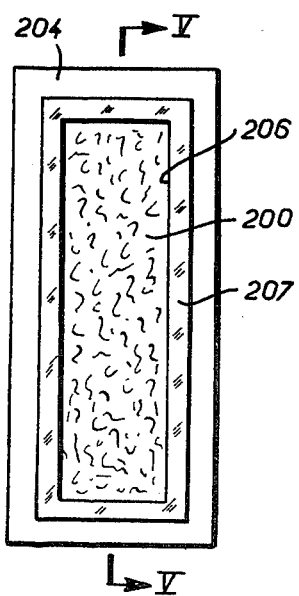
FIG. 4 is a cross-section through a filter on the arrow IV in FIG. 5.
Figure 5:
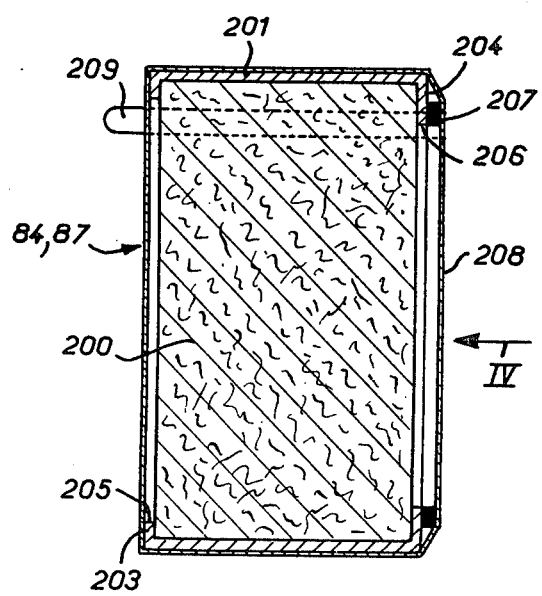
FIG. 5 is a view of the filter in elevation.

Air filter device 80 will now be described with reference to FIGS. 3 to 6. Referring to FIG. 3, air is admitted through an inlet 83 to a first box 81 in which is housed a filter 84 comprising a prefilter/absolute filter assembly.

Figure 6:
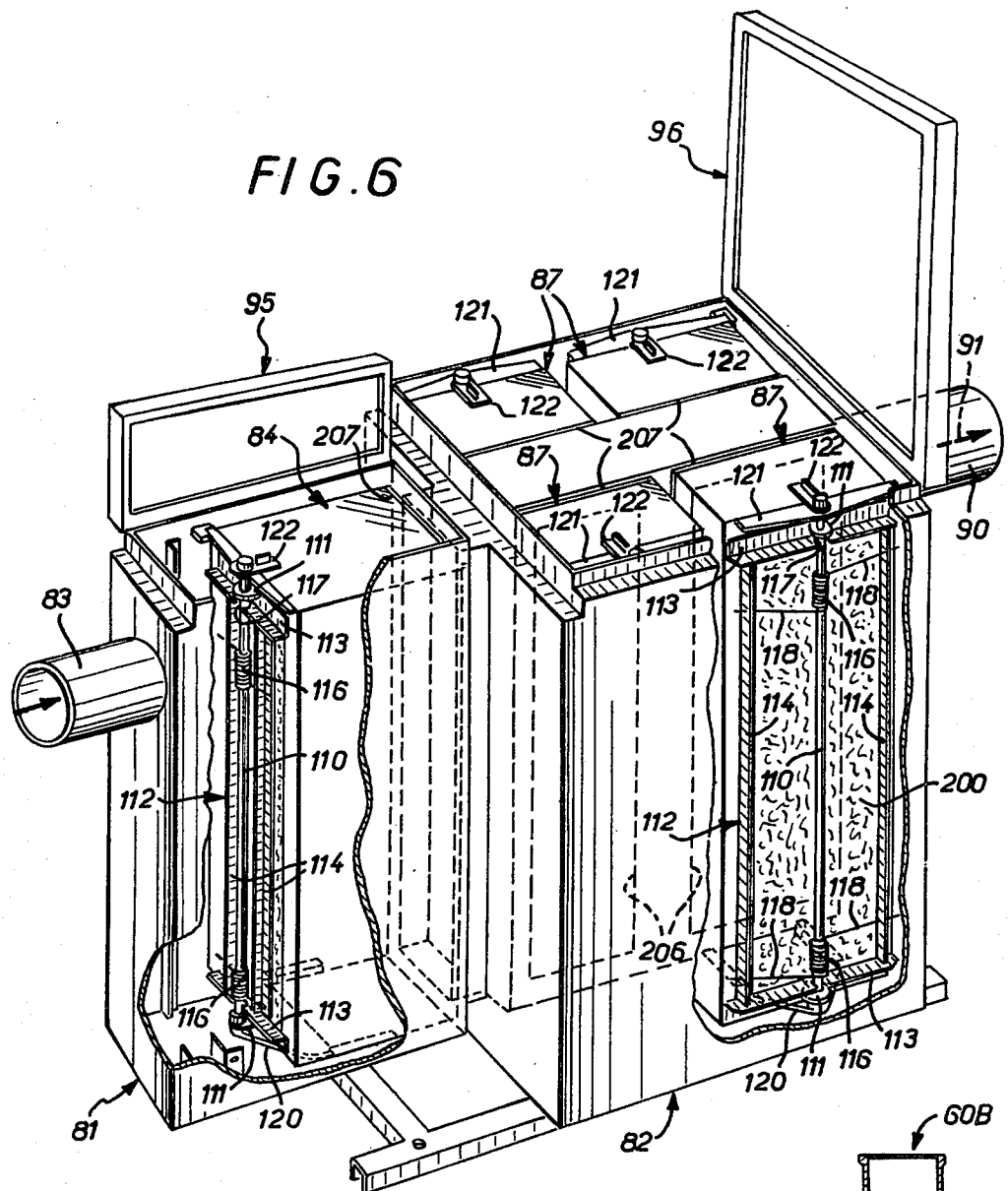
FIG. 6 is a partially cut away perspective view of the filter device in accordance with the present invention.

Filter 84 is clamped up by a camshaft device represented schematically in FIG. 3 by the arrow 100 and to be described later with reference to FIG. 6. This compresses a gasket 207 of assembly 84 disposed against the outlet of box 81. The air is then admitted (arrow 86) into a box 82 containing four activated carbon filters 87.

After passing through filters 87 (arrows 88), the air is admitted into a chamber 89 at the center of box 82. The air is then taken off via an outlet 90 (arrow 91). Each of filters 87 comprises a gasket 207, similar to that of filter 84, providing a seal between the outlet from filter 87 and the inlet to chamber 89. This gasket is compressed by a camshaft device similar to that of filter 84 and represented schematically by the arrows 100′.

Chamber 89 is designed in such a way that only air from filters 87 can enter it and be drawn off from it through outlet 90.

The construction of absolute filters 84 and activated carbon filters 87 will be familiar to the man skilled in the art and will not, therefore, be further described here. However, their particular arrangemet in accordance with the invention will now be described to reference to FIGS. 4 and 5.

In the embodiment shown, filters 84 and 87 comprise filtration and trap elements 200 contained in a parallelepipedal enclosure 201. The front surface 203 and rear surface 204 of this enclosure are apertured (openings 205, 206). Gasket 207 is disposed around opening 206.

To prevent poisoning of the activated carbon in time of peace, activated carbon filters 87 are protected by a quick-opening (tear-off strip 209) lightweight metal package 208. In the embodiment shown, filter 84 is also protected. In an alternative embodiment, filter 84 would not comprise the lightweight metal package 208, being instead disposed directly in box 81.

The arrangement of filters 84 and 87 in boxes 81 and 82 will now be described with reference to FIG. 6.

Filter 84 is disposed in box 81, its rear surface 204 with gasket 207 being disposed against the passage leading from box 81 to box 82.

Filters 87 are disposed in box 82, their surface 206 with gasket 207 being directed towards the openings in chamber 89.

As indicated hereinabove, gaskets 207 of filters 84 and 87 are compressed by a camshaft device which will now be described.

This device comprises a shaft 110 which is free to rotate in a bottom bearing 120 attached to the bottom of box 81 (82) and a top bearing 121 attached to box 81 (82). A frame 112 formed by two L-shaped cross-members 113 and two longitudinal members 114 is elastically mounted on shaft 110 by means of springs 116. To this end, cross-members 113 are formed with a notch 117 in which shaft 110 engages and longitudinal members 114 retain the arms 118 of springs 116. Frame 112 is thus elastically movable relative to shaft 110 and may move away from same.

Shaft 110 has at each end, above bearing 120 and below bearing 121, a cam 111. Cams 111 are attached to shaft 110 so as to rotate therewith. At its upper end, above bearing 121 through which it passes, shaft 110 has an arming lever 122.

In time of peace, filters 84 and 87 are protected by their packaging and stored in their respective positions in boxes 81 and 82.

Cams 111 are not armed, and so frame 112 is maintained in contact with shaft 110 by springs 116. Filters 84 and 87 may be easily inserted into and removed from their box since frame 112 does not exert any pressure on them.

Under alert conditions, the packaging 208 is removed from the filters by means of the quick-opening device (tear-off strip 209) and filters 84 and 87 are replaced in their respective locations in boxes 81 and 82. Cams 111 are then armed by means of an arming key which actuates levers 112 so as to pivot shaft 110 through approximately one quarter-turn. As a result, frames 112 clamp up enclosures 201 of filters 84 and 87, thus compressing gaskets 207. Boxes 81 and 82 are closed by means of sealed lids 95 and 96.

The filtration and air cleaning installation is then operational, and the airflow follows the path schematically represented by arrows 86, 88 and 91 (FIG. 3).

In use, the shelter offers the following protection characteristics:

As soon as the alert is given, the occupants of the shelter may enter it through entry sections 60A and 60B and lock doors 40 and 41 after removing the protective filter packaging and locking the filters as indicated hereinabove.

In the event that either of entry-exit sections 60A and 60B is rendered unserviceable, by bombardment, the other remains available.

Fan 55 and overpressure valve 57 maintain the shelter interior pressurized to a pressure approximately 2 mbars above that in the airlock. The airlock is itself pressurized to a pressure approximately 1 to 2 mbars above the external pressure acting on overpressure/anti-blast valve assembly 58. This cascaded pressurization guarantees sealing of the shelter interior against ingress of air from the outside or from the airlock and the pressurization of the airlock relative to the outside pressure seals it against entry of gas from the outside. These overpressures also provide for evacuation of any polluted air which may enter, on opening the airlock to carry out a reconnaissance, for example.

The location of filter device 80 in airlock 30 protects the occupants against possible radiation from the filters, especially the prefilter and absolute filter, after these have absorbed a significant quantity of radioactive dust.

The storage of the filters in time of peace in boxes 81 and 82, protected by readily removable packaging, and the ease with which the camshaft devices may be operated, maintains the condition of the filters in time of peace while simplifying their deployment in the event of an alert. The camshaft device provides a quick and effective means of clamping the filters against their respective gaskets so as to oblige external air to pass through them before admission to shelter interior 42.

MODIFICATION

A modified form of the installation described with reference to FIGS. 1 and 2 will now be described with reference to FIG. 7.

The shelter 10 is again in the form of a tubular tunnel 11 comprising two entry-exit sections 60A and 60B.

As in FIG. 1, two airlocks isolate the shelter interior 42 from the outside. In this embodiment, an airlock 30A is associated with entry section 60A and an airlock 30B is associated with entry section 60B. Airlocks 30A and 30B are identical to airlock 30, except that they do not comprise any decontamination showers 77.

Figure 7:
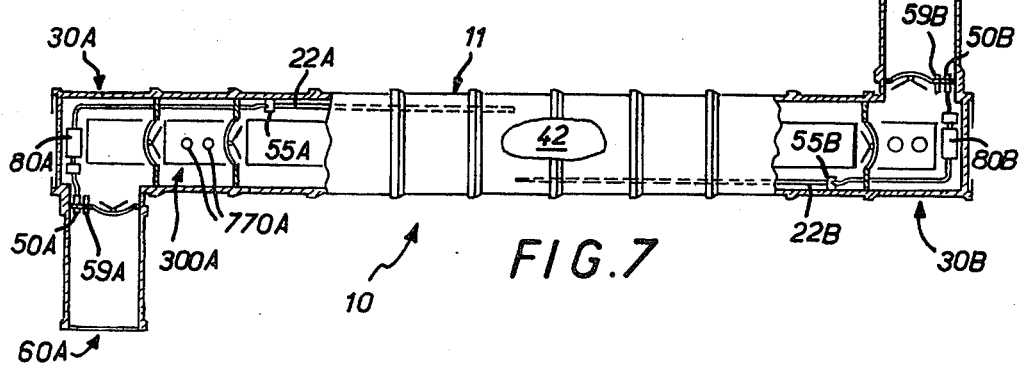
FIG. 7 is a plan view of a variant of the installation shown in FIG. 1.

The same reference numbers are used for the various parts of airlock 30 in FIG. 7, with the suffix letter A or B, according to whether they are parts of airlock 30A or parts of airlock 30B.

In the embodiment shown in FIG. 7, a secondary or final decontamination airlock 300A is disposed between shelter interior 42 and airlock 30A.

As previously, airlock 30A comprises a sealed door 40 which, in this embodiment, is disposed between airlock 30A and airlock 300A. Airlock 300A comprises a sealed door 400A identical to door 40A, controlling access to the interior 42 of shelter 11.

Door 400A has a three-point locking device 440A identical to that previously described with reference to FIG. 2. Decontamination showers 770A are disposed in airlock 300A.

These arrangements are highly advantageous in that they enable shelter occupants to carry out reconnaissance and to decontaminate themselves afterwards in a simple manner.

If both entry sections 60A and 60B, airlocks 30A and 30B and air filter devices 80A and 80B are intact after the explosion, airlock 30A and section 60A are used for all reconnaissance patrols.

On return from a reconnaissance patrol, the personnel enter the shelter through section 60A.

First level or primary decontamination procedures are carried out, using resources familiar to the man skilled in the art, in airlock 30A. The principle of this primary decontamination is to eliminate solid particles and materials in suspension.

Once primary decontamination has been carried out, the personnel enter airlock 300A and lock sealed door 40A. They then carry out final decontamination, remove their clothing and use showers 770.

The output from the two ventilation installations for airlocks 30A and 30B is routed to airlocks 300A and 30A during the two contamination phases. For this purpose, air outlet 59B of airlock 30B is closed. The pressure in the shelter increases substantially, particularly in airlock 300A. The flow of air into this airlock thus increases, favoring optimum final decontamination.

It will be understood that various changes in the details, materials and arrangements of parts, which have been herein described and illustrated in order to explain the nature of the invention, may be made by those skilled in the art within the principle and scope of the invention as expressed in the appended claims.

What we claim is:

1. A pressurization and filter installation for shelters of the type having a substantially horizontal tubular tunnel, said installation comprising an entry-exit section, an entry-exit airlock communicating with said entry-exit section, means for pressurizing said entry-exit airlock to a pressure higher than the normal pressure external of said shelter, an armored door on the outside of said airlock, a sealed door on the inside of said airlock, a filter unit disposed in said airlock and comprising an absolute filter and an activated carbon filter each including an enclosure for housing filtration elements and having entry and exit openings through which air passes, a box in which said enclosure is disposed, sealing means adjacent said exit opening for providing a seal between said enclosure and said box, a frame, support means for supporting said frame, cam means mounted on said support means, means for rotating said cam means to urge said frame against said enclosure and thereby urge said enclosure against said box to establish said seal, and means for pressurizing the interior of said shelter to a pressure higher than the pressure in said airlock.

2. The installation of claim 1 wherein said support means comprises a shaft rotatably supported in said box and spring means mounted on said shaft, and wherein said frame includes means for receiving at least a portion of said spring means to be elastically supported on said shaft.

3. The installation of claim 2 wherein said cam means are mounted on said shaft, and wherein said means for rotating comprises a lever coupled to said shaft for rotating same, whereby said cam means are rotated.

* * * * *